(12) United States Patent
Arimatsu et al.

(10) Patent No.: US 10,128,727 B2
(45) Date of Patent: Nov. 13, 2018

(54) ROTOR MEMBER, ROTOR, ELECTRIC MOTOR, MACHINE TOOL, AND MANUFACTURING METHOD OF ROTOR

(71) Applicant: FANUC CORPORATION, Yamanashi (JP)

(72) Inventors: Yohei Arimatsu, Yamanashi (JP); Kenji Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 273 days.

(21) Appl. No.: 14/935,665

(22) Filed: Nov. 9, 2015

(65) Prior Publication Data
US 2016/0141929 A1  May 19, 2016

(30) Foreign Application Priority Data
Nov. 13, 2014 (JP) .................... 2014-231003

(51) Int. Cl.
*H02K 1/27* (2006.01)
*H02K 15/03* (2006.01)
*H02K 1/30* (2006.01)

(52) U.S. Cl.
CPC ............. *H02K 15/03* (2013.01); *H02K 1/278* (2013.01); *H02K 1/30* (2013.01)

(58) Field of Classification Search
CPC .......... H02K 15/03; H02K 1/30; H02K 1/278; H02K 1/2786
USPC ........................................ 310/156.12; 29/598
See application file for complete search history.

(56) References Cited

U.S. PATENT DOCUMENTS

| | | | | |
|---|---|---|---|---|
| 4,039,705 A * | 8/1977 | Douek | ...................... | C09J 4/06 428/41.5 |
| 6,047,461 A * | 4/2000 | Miura | .................... | H02K 1/278 29/596 |
| 6,104,115 A * | 8/2000 | Offringa | ................ | H02K 1/278 29/598 |
| 6,242,833 B1 * | 6/2001 | Mobius | .................. | H02K 1/278 310/156.01 |
| 7,075,204 B2 * | 7/2006 | Shiao | ..................... | H02K 5/128 310/156.12 |

(Continued)

FOREIGN PATENT DOCUMENTS

CN     1211100 A    3/1999
CN   202840886 U    3/2013

(Continued)

OTHER PUBLICATIONS

Translation of foreign document JP 2011129857 A (Year: 2011).*

(Continued)

*Primary Examiner* — Alex W Mok
(74) *Attorney, Agent, or Firm* — Fredrikson & Byron, P.A.

(57) ABSTRACT

A rotor member includes a cylindrical sleeve part having a circular outer peripheral surface, a plurality of magnets arranged along the outer peripheral surface and including an inner peripheral surface having a curvature radius larger than a curvature radius of the outer peripheral surface, and a cylindrical holding member surrounding the plurality of magnets. Between the outer peripheral surface of the sleeve part and the inner peripheral surface of the magnets, a gap of a radial direction increased toward a circumferential edge portion of the magnets is formed.

1 Claim, 12 Drawing Sheets

(56) References Cited

U.S. PATENT DOCUMENTS

| | | | |
|---|---|---|---|
| 2003/0201683 A1* | 10/2003 | Chen | F16C 33/107 |
| | | | 310/90 |
| 2005/0029885 A1 | 2/2005 | Shiao et al. | |
| 2005/0235481 A1* | 10/2005 | Ku | H02K 1/278 |
| | | | 29/596 |
| 2007/0114861 A1* | 5/2007 | Bott | B65G 13/075 |
| | | | 310/71 |
| 2009/0046960 A1* | 2/2009 | Hibi | F16C 17/02 |
| | | | 384/107 |
| 2012/0326555 A1* | 12/2012 | Arimatsu | H02K 1/30 |
| | | | 310/216.121 |
| 2013/0113324 A1* | 5/2013 | Shepard | H02K 1/2786 |
| | | | 310/156.12 |
| 2013/0162090 A1* | 6/2013 | Kwok | H02K 1/278 |
| | | | 310/156.12 |

FOREIGN PATENT DOCUMENTS

| | | | | |
|---|---|---|---|---|
| CN | 103312069 A | 9/2013 | | |
| EP | 0034708 A2 * | 9/1981 | | C09J 4/00 |
| EP | 0034709 A2 * | 9/1981 | | C09J 4/00 |
| JP | 11089142 A | 3/1999 | | |
| JP | 2010093988 A | 4/2010 | | |
| JP | 2011041371 A | 2/2011 | | |
| JP | 2011129857 A | 6/2011 | | |
| JP | 20139528 A | 1/2013 | | |
| JP | 2013035950 A | 2/2013 | | |
| JP | 2014099988 A | 5/2014 | | |

OTHER PUBLICATIONS

Translation of foreign document JP 2014099988 A (Year: 2014).*
English Translation for Japanese Publication No. 2014099988, published May 29, 2014, 20 pages.
English Translation for Japanese Publication No. 2013035950, published Feb. 21, 2013, 12 pages.
English Translation for Japanese Publication No. 2011041371, published Feb. 24, 2011, 12 pages.
English Translation for Japanese Publication No. 2010093988, published Apr. 22, 2010, 7 pages.
English Translation for Chinese Publication No. 103312069, published Sep. 18, 2013, 8 pages.
English Abstract for Japanese Publication No. 11-089142 A, published Mar. 30, 1999, 12 pgs.
English Abstract and Machine Translation for Japanese Publication No. 2013-009528, published Jan. 10, 2013, 26 pgs.
English Abstract and Machine Translation for Chinese Publication No. 202840886 U, published Mar. 27, 2013, 13 pgs.
English Abstract and Machine Translation for Japanese Publication No. 2011-129857 A, published Jun. 30, 2011, 12 pgs.
English Abstract and Machine Translation for Chinese Publication No. 1211100 A, published Mar. 17, 1999, 10 pgs.

* cited by examiner

FRONT ←→ REAR

FRONT ⟵⟶ REAR

FRONT ← → REAR

ROTOR MEMBER, ROTOR, ELECTRIC MOTOR, MACHINE TOOL, AND MANUFACTURING METHOD OF ROTOR

TECHNICAL FIELD

The present invention relates to a rotor member of a dynamo-electric machine, a rotor, an electric motor provided with a rotor, a machine tool provided with an electric motor, and a manufacturing method of a rotor.

BACKGROUND ART

When an electric motor using a permanent magnet as a rotor is rotated at a high speed, it is necessary to perform some kind of reinforcement for the strength of the permanent magnet itself and a structure for fixing the permanent magnet in order to sufficiently withstand a centrifugal force at the time of high speed rotation. In this case, in general, for example, a reinforcement structure covered with a sleeve made of a carbon fiber or titanium is provided. For example, Japanese Laid-open Patent Publication No. 11-89142 discloses a synchronous electric motor for high speed rotation which uses a ring-like magnet and reinforces the outer periphery of the magnet with carbon fiber-reinforced plastic (CFRP).

Meanwhile, this-type of electric motor is configured by press-fitting a rotating axis into a rotor member. Consequently, when a press-fitting margin when press-fitting the rotating axis is large, a diameter of a sleeve may be expanded and a magnet may be cracked. On the other hand, when the press-fitting margin is small, since it is not possible to hold the magnet with respect to the sleeve with sufficient pressing force, the position of the magnet for the sleeve may be deviated at the time of high speed rotation.

As disclosed in Japanese Laid-open Patent Publication No. 11-89142, when the magnet is held by surrounding the periphery of the magnet with the carbon fiber-reinforced plastic, holding force increases according to an increase in tension of the carbon fiber-reinforced plastic. However, when the tension excessively increases, since scattering of a fiber of the carbon fiber-reinforced plastic, and peeling, cracking, breaking and the like of a fiber layer may occur, there is a limitation in increasing the tension.

SUMMARY OF INVENTION

An aspect of the present invention is a rotor member fixed to a rotating axis unit of a dynamo-electric machine, and the rotor member includes a cylindrical sleeve part having a circular outer peripheral surface, a plurality of magnets arranged along the outer peripheral surface, each of the plurality of magnets includes an inner peripheral surface having a curvature radius larger than a curvature radius of the outer peripheral surface, and a cylindrical holding member surrounding the plurality of magnets, wherein between the outer peripheral surface of the sleeve part and the inner peripheral surface of the magnets, a gap of a radial direction increased toward a circumferential edge portion of the magnets is provided.

Another aspect of the present invention is a rotor including a rotating axis unit, and the rotor member, which is press-fitted and fixed to an outer peripheral surface of the rotating axis unit, wherein the outer peripheral surface of the sleeve part and the inner peripheral surface of the magnets make contact with each other such that the gap is eliminated by diameter expansion of the sleeve part due to the press-fitting of the rotating axis unit, and the sleeve part and the plurality of magnets are interposed between the rotating axis unit and the holding member by elastic restoring force generated in the holding member toward a radial inside by the press-fitting of the rotating axis unit.

Further another aspect of the present invention is an electric motor including the aforementioned rotor.

Further another aspect of the present invention is a machine tool including the aforementioned electric motor.

Further another aspect of the present invention is a method for manufacturing the aforementioned rotor, and the method includes the steps of arranging the plurality of magnets along the outer peripheral surface of the sleeve part, arranging the holding member so as to surround the plurality of magnets, impregnating an adhesive between the sleeve part and the magnets, press-fitting the rotor member to a radial outside of the rotating axis unit before the adhesive is hardened, allowing the outer peripheral surface of the sleeve part and the inner peripheral surface of the magnets to make contact with each other such that the gap is filled by diameter expansion of the sleeve part due to the press-fitting of the rotating axis unit when the rotor member is press-fitted, and allowing the sleeve part and the plurality of magnets to be interposed between the rotating axis unit and the holding member by elastic restoring force generated in the holding member toward a radial inside by the press-fitting of the rotating axis unit.

DETAILED DESCRIPTION OF EMBODIMENTS

Figure 1:
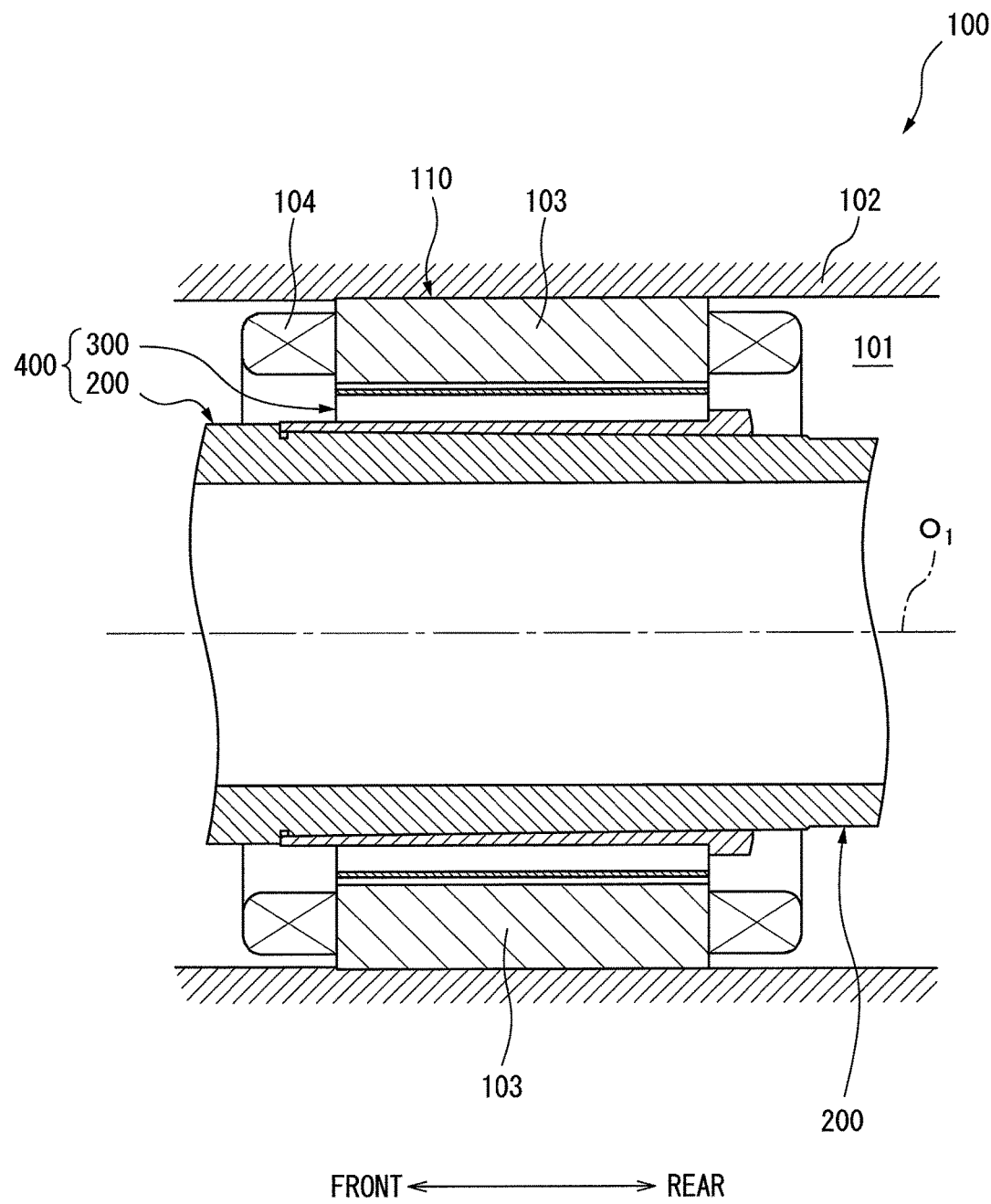
FIG. 1 is a sectional view of an electric motor according to an embodiment of the present invention.

Hereinafter, an embodiment of the present invention will be described with reference to the drawings. Firstly, with reference to FIG. 1, a configuration of an electric motor (a dynamo-electric machine) according to an embodiment of the present invention will be described. FIG. 1 is a sectional view of an electric motor 100 according to an embodiment of the present invention. Hereinafter, a direction along an axial center $O_1$ of a rotating axis unit of the electric motor 100 will be defined as an axial direction, a direction along a peripheral surface of a circle about the axial center $O_1$ will be defined as a circumferential direction, and a direction radially extending from the axial center $O_1$ will be defined as a radial direction. Furthermore, one side and the other side of the electric motor 100 as illustrated in FIG. 1 will be defined as an axial front side and an axial rear side, respectively. In addition, the axial front side and the axial rear side are conveniently defined from the standpoint of the facilitation of understanding, and are not intended to limit specific directions of a front side, a rear side and the like of the electric motor.

The electric motor 100 according to the present embodiment, for example, is a built-in motor used in order to drive a main shaft of a machine tool. The built-in motor is directly assembled to an object to be rotated, i.e., a main shaft and its main object is to directly drive the main shaft. As described above, the electric motor for driving the main shaft of the machine tool is employed as a built-in motor, and therefore it is possible to improve the processing accuracy of the main shaft.

As illustrated in FIG. 1, the electric motor 100 includes a housing 102 that defines an internal space 101, a stator 110 arranged in the internal space 101 of the housing 102 so as to be stationary, and a rotor 400 rotatably installed radially inside the stator 110. The rotor 400 is mounted at the surface thereof with a plurality of magnets 311 (see FIG. 4) and the electric motor 100 is a surface permanent magnet-type motor (a SPM-type motor). The stator 110 has a stator core 103 and a coil 104 wound around the stator core 103. The stator core 103, for example, is configured by stacking thin plates of electromagnetic steel sheets.

From the stator 110, a power line (not illustrated) electrically connected to the coil 104 is taken out and is connected to a power line (not illustrated) installed at an exterior of the electric motor 100 via a through hole provided in the housing 102. When the electric motor 100 operates, for example, a three-phase AC current is supplied to the coil 104, and therefore a rotating magnetic field is formed around the rotor 400.

The rotor 400 has a rotating axis unit 200 extending in the axial direction in the internal space 101, and a rotor member 300 fastened radially outside the rotating axis unit 200. The electric motor 100 generates rotational power by magnetic interaction of the rotor 400 and the stator 110, and the rotating axis unit 200 and the rotor member 300 integrally rotate about the axial center $O_1$.

Figure 2:
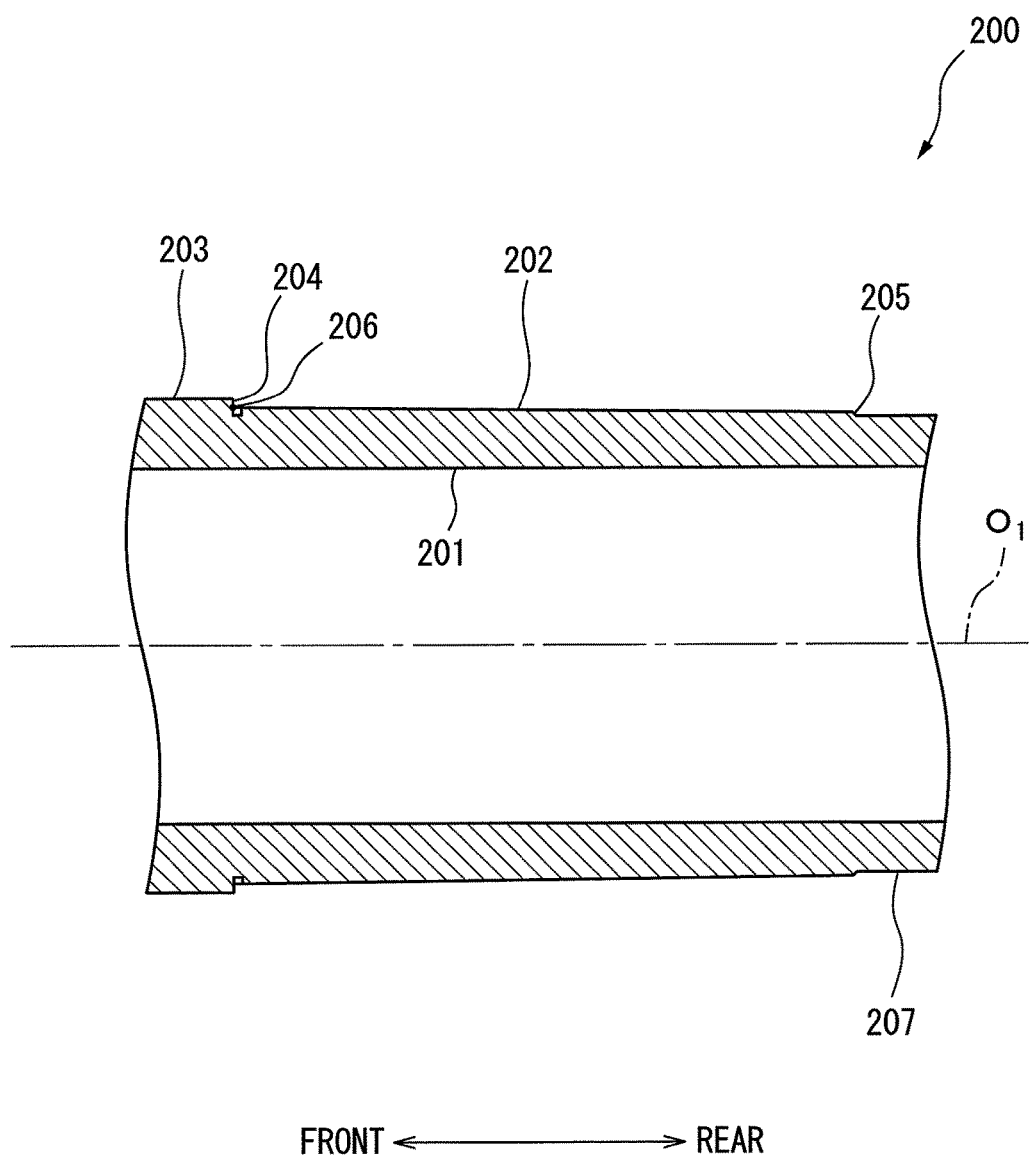
FIG. 2 is a sectional view of a rotating axis unit illustrated in FIG. 1.

Next, with reference to FIG. 2, the rotating axis unit according to the embodiment of the present invention will be described. FIG. 2 is a sectional view of the rotating axis unit 200 according to the present embodiment. As illustrated in FIG. 2, the rotating axis unit 200 is a cylindrical member having the axial center $O_1$ and a center hole 201 concentric with the axial center $O_1$. In the present embodiment, in order to apply the electric motor 100 to the main shaft of the machine tool as a built-in motor, the center hole 201 is formed in the rotating axis unit 200; however, the present invention is not limited thereto. In other words, the rotating axis unit 200 may also be made of a solid material having no center hole 201.

The axial center $O_1$ of the rotating axis unit 200 is a rotation axis of the electric motor 100. A part of an axial front side of the rotating axis unit 200 is supported rotatably to the housing 102 via a bearing (not illustrated) mounted at a front wall portion of the housing 102. Similarly, a part of an axial rear side of the rotating axis unit 200 is supported rotatably to the housing 102 via a bearing (not illustrated) mounted at a rear wall portion of the housing 102.

The rotating axis unit 200 has a tapered outer peripheral surface 202 directed from the axial rear side to the axial front side and gradually widened toward the radial outside. A part 203 and a stepped part 204 of the axial front side of the rotating axis unit 200 are an example of abutting parts that are provided for convenience at the time of manufacturing. The tapered outer peripheral surface 202 continuously extends from an axial rear end 205 to an axial front end 206. At an axial rear side of the axial rear end 205 of the tapered outer peripheral surface 202, a cylindrical outer peripheral surface 207 linearly extending along the axial direction is formed.

In addition, preferably, the tapered outer peripheral surface 202 is a linear tapered surface, i.e., a conical surface. In this case, a radius of the tapered outer peripheral surface 202 linearly increases from the axial rear end 205 to the axial front end 206. Preferably, the tapered outer peripheral surface 202, for example, is a linear tapered surface having a taper ratio of 1/200 to 1/300.

The abutting part 203 and the stepped part 204 are an example of a design for facilitating assembly work at the time of manufacturing. The abutting part 203 has a cylindrical outer peripheral surface extending along the axial direction, and the abutting part 203 is formed to protrude radially outside from the tapered outer peripheral surface 202 in order to form the stepped part 204 between the abutting part 203 and the axial front end 206 of the tapered outer peripheral surface 202.

Figure 3:
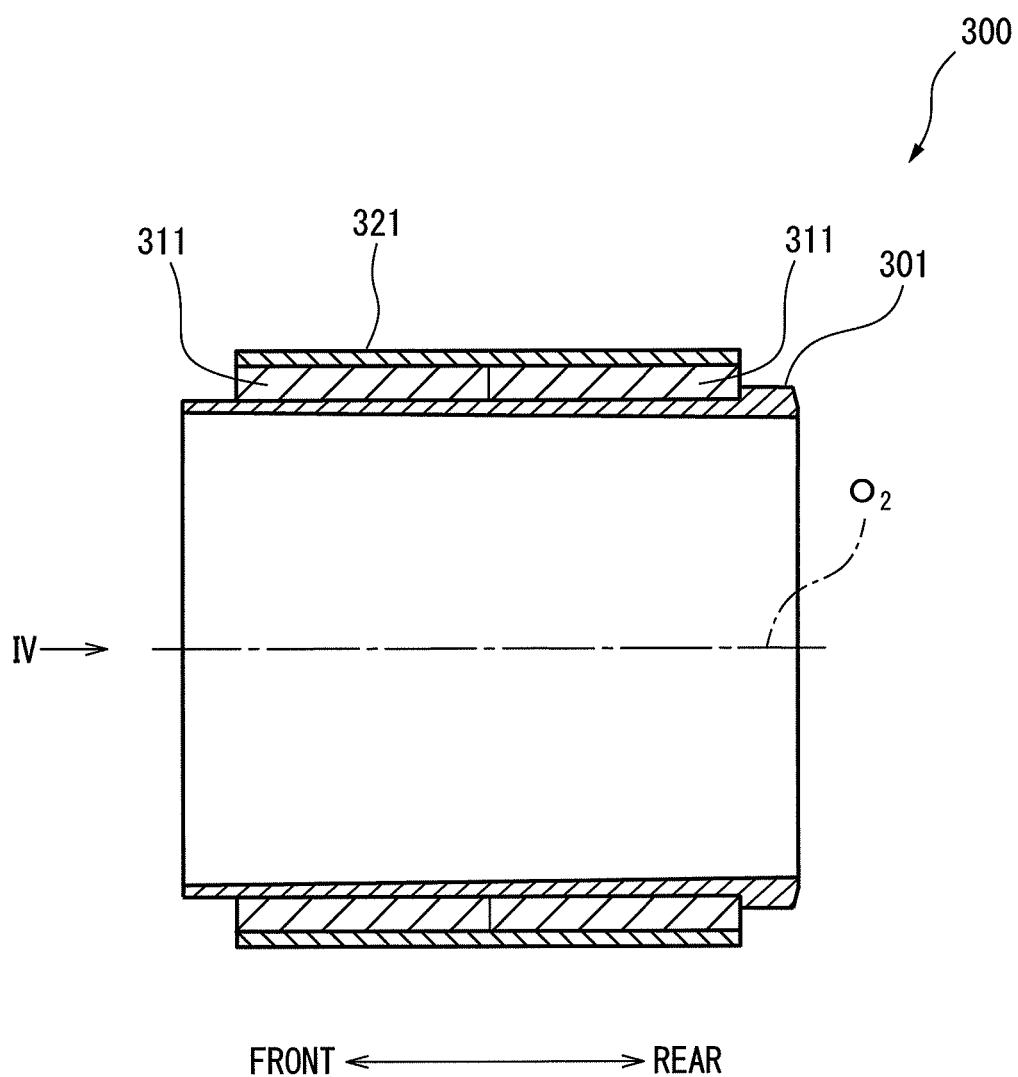
FIG. 3 is a sectional view of a rotor member illustrated in FIG. 1.
Figure 4:
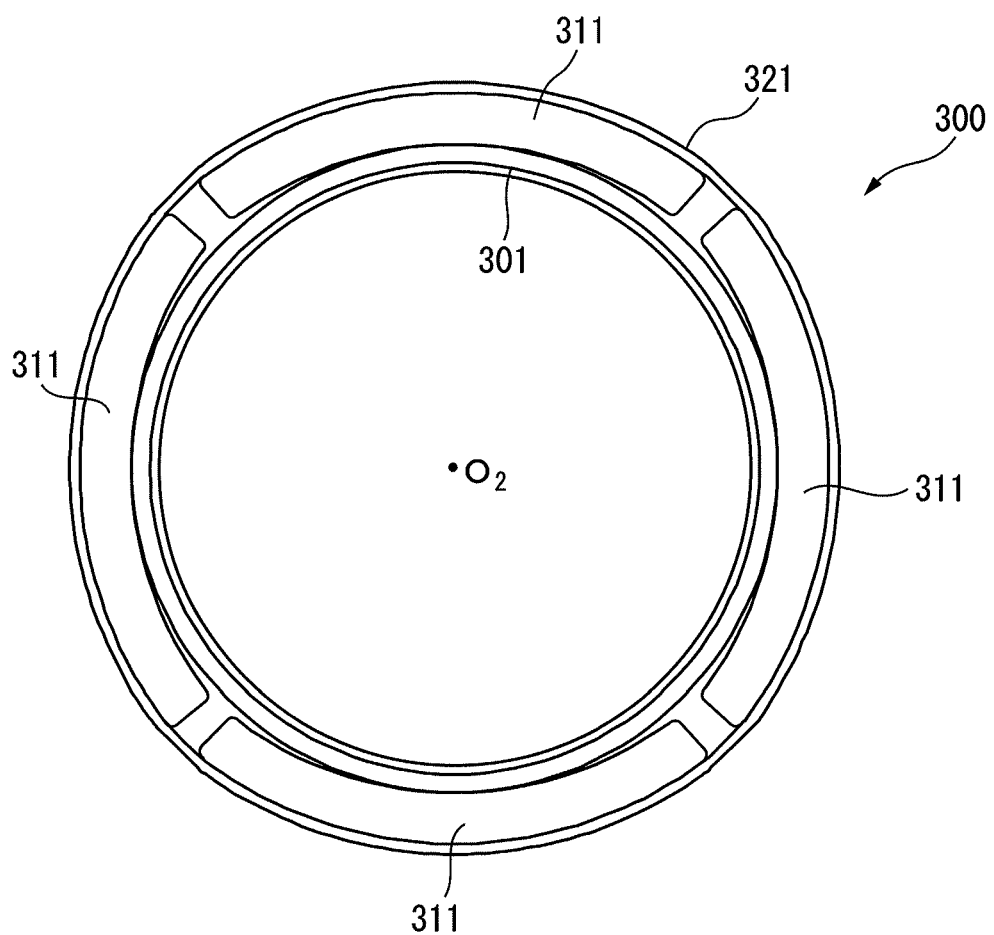
FIG. 4 is an external appearance view when a rotor member illustrated in FIG. 1 is viewed from an axial direction.

Next, with reference to FIG. 3 to FIG. 7, the rotor member according to the embodiment of the present invention will be described. FIG. 3 is a sectional view of the rotor member 300 according to the present embodiment, and FIG. 4 is an external appearance view (a view viewed from the arrow IV of FIG. 3) when the rotor member 300 is viewed from the axial direction. As illustrated in FIG. 3 and FIG. 4, the rotor member 300 has a cylindrical sleeve part 301, and a plurality of magnets 311 arranged in a row in the circumferential direction and a holding member 321, which covers all the plurality of magnets 311 from the radial outside, at the radial outside of the sleeve part 301.

The magnets 311 are permanent magnets each having an inner diameter side formed in an arc shape, and in the example of FIG. 4, four magnets 311 are arranged at an equal interval in the circumferential direction along an outer peripheral surface 304 of the sleeve part 301. In addition, the magnets 311 having a number different from the four magnets 311 exemplified in FIG. 4 may also be arranged in the circumferential direction. In other words, if a plurality of magnets 311 are symmetrically arranged in the circumferential direction, the number of magnets 311 may not be four.

The magnets 311 may also be divided in a plural number in the axial direction according to the viewpoint of manufacturing or magnet formation, and in the example of FIG. 3, the magnets 311 are divided into two in the axial direction. In addition, the magnets 311 may also be divided into three or more. Furthermore, a structure of a convex part 305 and the like is provided to the sleeve part 301, and therefore the respective magnets 311 positioned at the axial rear side are arranged by aligning axial direction positions. As the magnet 311, for example, a neodymium magnet having high magnetic energy can be used. In this way, a compact electric motor with high output can be configured, and is suitable when used in a main shaft of a machine tool.

Figure 5:
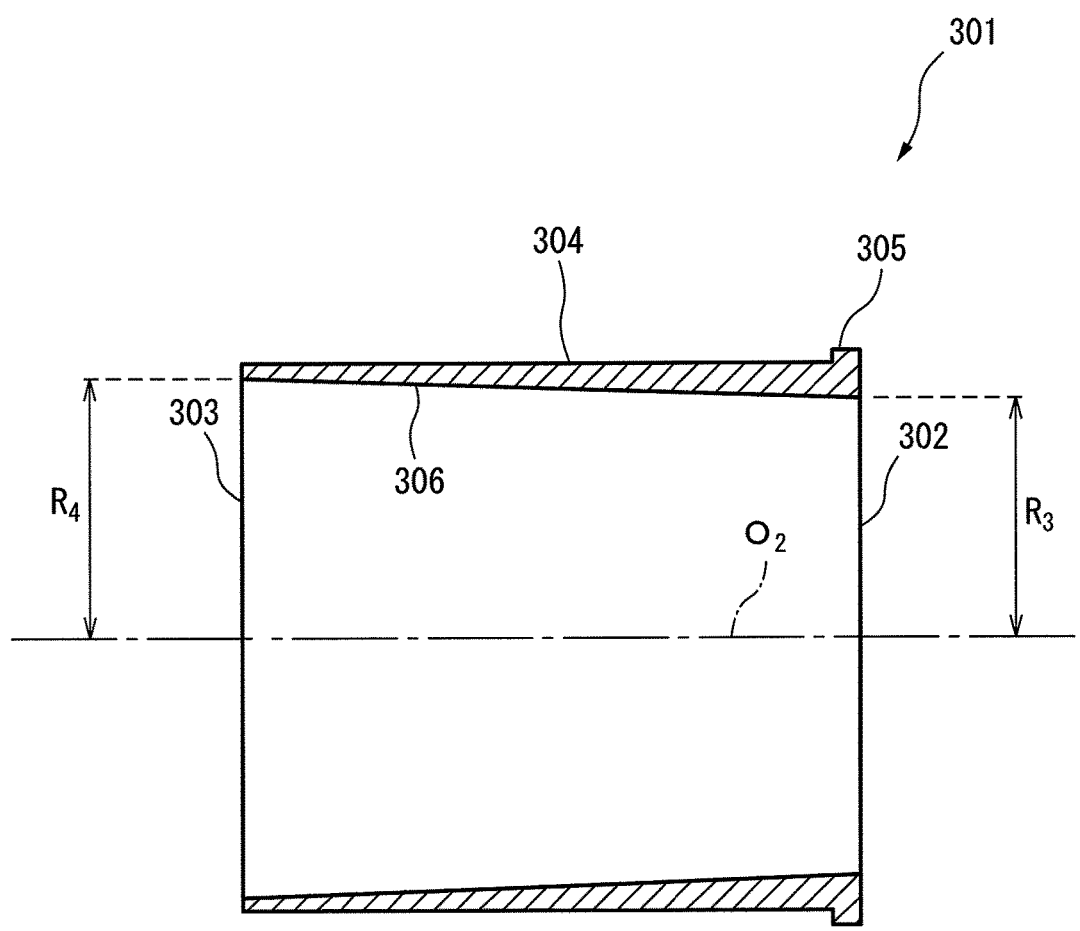
FIG. 5 is a sectional view of a sleeve part illustrated in FIG. 3.

FIG. 5 is a sectional view of the sleeve part 301. As illustrated in FIG. 5, the sleeve part 301 is a cylindrical member having a center axis line $O_2$, and has a first end portion 302 of the axial rear side, a second end portion 303 of the axial front side, and the cylindrical outer peripheral surface 304 extending along the axial direction. The convex part 305, which is positioned at the axial rear end of the sleeve part 301 and protrudes radially outside from the outer peripheral surface 304, is an example of a design for easily aligning of the axial direction positions of the magnets 311 at the time of manufacturing.

The sleeve part 301 is made of an iron-based metal, for example, a metal material of a magnetic body such as S45C, STKM, and SS400. The outer peripheral surface 304 of the sleeve part 301 has been subjected to a phosphoric acid-based, a sulfuric acid-based, or a hydrochloride acid-based chemical surface treatment. In this way, a frictional coefficient of the outer peripheral surface 304 becomes large, and therefore it is possible to easily hold the magnets 311 on the outer peripheral surface 304. Furthermore, the chemical surface treatment is performed on the outer peripheral surface 304, and therefore a hardening reaction of an adhesive is promoted when the adhesive has been impregnated into the outer peripheral surface 304 as will be described later. Furthermore, adhesive force itself is also increased. In a single state of the rotor member 300 before the rotating axis unit 200 is inserted, the magnets 311 do not adhere to the outer peripheral surface 304 of the sleeve part 301.

In the present embodiment, the sleeve part 301 has a tapered inner peripheral surface 306 (i.e., a tapered surface) directed from the first end portion 302 to the second end portion 303 and continuously widened toward the radial outside. The tapered inner peripheral surface 306 continuously extends in an axial direction section (a magnet-mounted section) in which the magnets 311 are mounted on at least outer periphery from the first end portion 302 to the second end portion 303. In other words, the tapered inner peripheral surface 306 is a tapered surface that is formed in the magnet-mounted section of the inner peripheral surface of the sleeve part 301 and that has a continuously constant taper ratio, and the radius of the tapered inner peripheral surface 306 increases toward the axial front side.

The tapered inner peripheral surface 306 is a linearly tapered surface having a constant taper ratio. The radius of the tapered inner peripheral surface 306 is linearly expanded toward the second end portion 303 from the first end portion 302 in the range of from a radius $R_3$ of the tapered inner peripheral surface 306 at the first end portion 302 to a radius $R_4$ ($>R_3$) of the tapered inner peripheral surface 306 at the second end portion 303. Preferably, the taper ratio of the tapered inner peripheral surface 306, for example, is set in the range of 1/200 to 1/30.

Here, the degree of the taper of the tapered inner peripheral surface 306 is set so as to cope with the degree of the taper of the tapered outer peripheral surface 202 of the rotating axis unit 200. In more detail, when both the tapered outer peripheral surface 202 of the rotating axis unit 200 and the tapered inner peripheral surface 306 of the sleeve part 301 are linearly tapered surfaces, the tapered outer peripheral surface 202 and the tapered inner peripheral surface 306 are set to have the same or approximately the same taper ratio (for example, 1/100).

In the assembly state of the electric motor 100 illustrated in FIG. 1, the sleeve part 301 is fixed on the tapered outer peripheral surface 202 of the rotating axis unit 200 by interference fit such that the center axis line $O_1$ of the rotating axis unit 200 and the center axis line $O_2$ of the sleeve part 301 coincide with each other. In this state, the second end portion 303 of the sleeve part 301 and the stepped part 204 abut each other, and therefore the radius $R_4$ of the tapered inner peripheral surface 306 at the second end portion 303 and the radius of the axial front end 206 of the tapered outer peripheral surface 202 are equal to or approximately equal to each other.

Furthermore, in this state, the tapered inner peripheral surface 306 of the sleeve part 301 and the tapered outer peripheral surface 202 of the rotating axis unit 200 make close contact with each other with large surface pressure, and the sleeve part 301 is pressed toward the radial outside by the rotating axis unit 200. In addition, a mounting structure of the sleeve part 301 for the rotating axis unit 200 will be described later.

Figure 6:
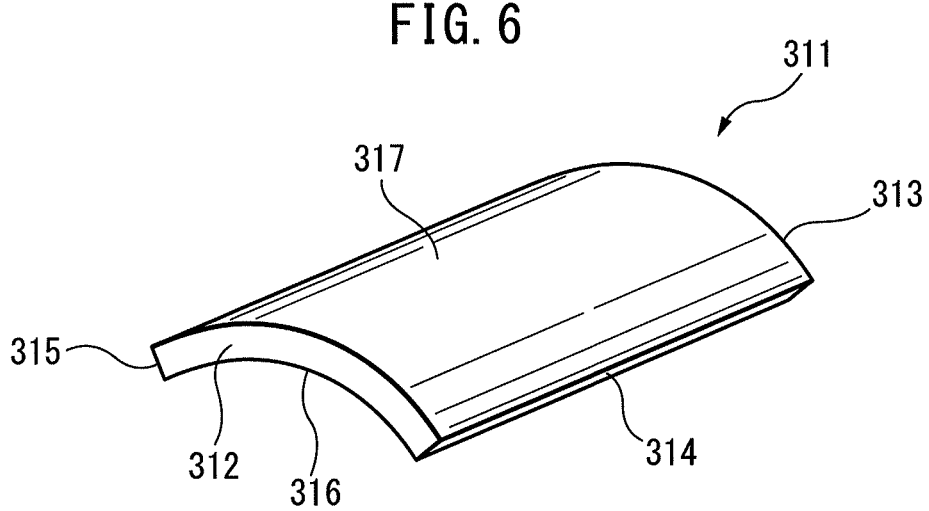
FIG. 6 is a perspective view of one of magnets illustrated in FIG. 3.

FIG. 6 is a perspective view of a single magnet 311. As illustrated in FIG. 6, the magnet 311 is an approximately arc-shaped magnetic piece having an inner diameter of a curvature radius decided in advance. In detail, the magnet 311 has an end surface 312 of the axial front side, an end surface 313 of the axial rear side, an end surface 314 of one side in the circumference direction, an end surface 315 of the other side in the circumference direction, an inner peripheral surface 316 of the radial inside, and an outer peripheral surface 317 of the radial outside. The inner peripheral surface 316 of the magnet 311 has an arc shape (curvature is constant), but the outer peripheral surface 317 is an arc shape, an arbitrary curved surface other than the arc shape, a plane, or a combination of a curved surface and a plane.

In the example of FIG. 6, the end surface 312, the end surface 313, the end surface 314, and the end surface 315 are clearly drawn as an example of the embodiment. However, these end surfaces are curved surfaces or minimum surfaces interposed between tapered surfaces or curved surfaces, according to magnetic circuit design or the specifications of an electric motor. Therefore, these end surfaces do not clearly exist. Furthermore, since a side forming each surface has been actually chamfered or has been gently deviated from a curved surface, the side is not defined by a clear line.

The inner peripheral surface 316 is an arc surface having a curvature radius decided in advance, and extends along the axial direction so as to connect one side of the radial inside, which forms the end surface 312, to one side which forms the radial inside of the end surface 313. The outer peripheral surface 317 is configured with a curved line smooth in the circumferential direction, and for example, may also be an arc surface or other arbitrary curved surfaces. The curvature radius of the inner peripheral surface 316 is decided by a relation with the curvature radius of the outer peripheral surface 304 of the sleeve part 301 as will be described later.

Figure 7:
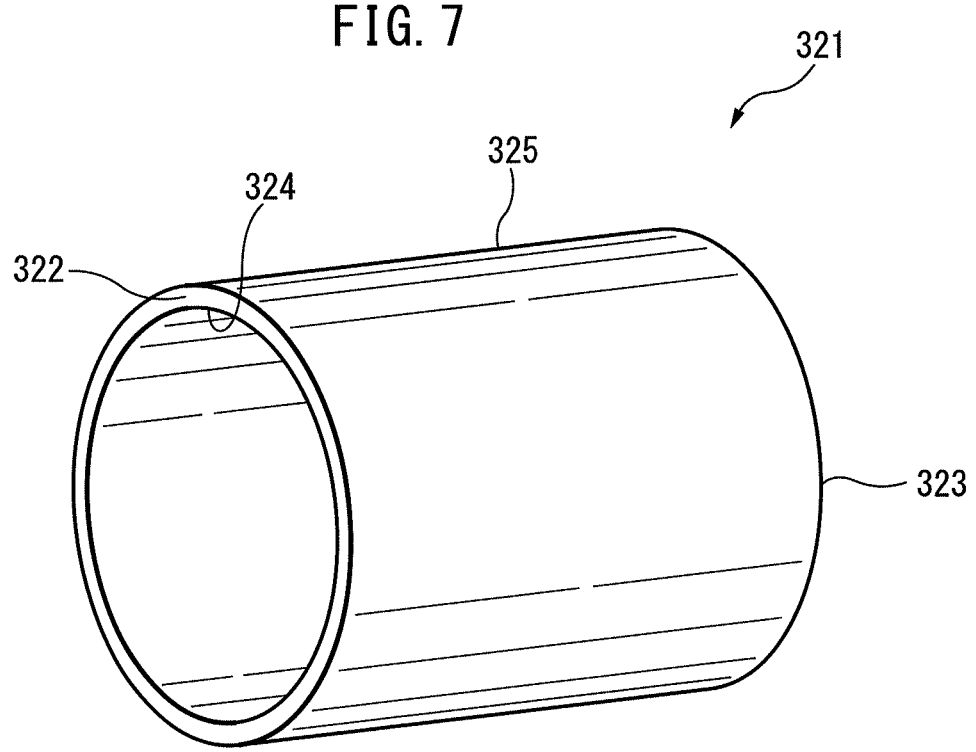
FIG. 7 is a perspective view of a holding member illustrated in FIG. 3.

FIG. 7 is a perspective view of the holding member 321. As illustrated in FIG. 7, the holding member 321 is a cylindrical member extending in the axial direction, and has a function of surrounding the plurality of magnets 311 to hold the magnets 311. In detail, the holding member 321 has an end surface 322 of the axial front side, an end surface 323 of the axial rear side, and cylindrical inner peripheral surface 324 and outer peripheral surface 325. In the example of FIG. 7, the end surface 322 and the end surface 323 are clearly drawn as an example of the embodiment, but do not clearly exist according to a material, a structure, and a manufacturing method of the holding member. Furthermore, the sectional shapes of the inner peripheral surface 324 and the outer peripheral surface 325 are not limited to a circle.

The holding member 321 has strength strong against deformation such as expansion toward the radial outside. In other words, the radius (the diameter) of the holding member 321 is difficult to be changed. Furthermore, preferably, the holding member 321 is made of a non-magnetic material from the standpoint of preventing heat generation due to magnetic flux or performance deterioration due to leakage of magnetic flux. Moreover, preferably, the holding member 321 has small density in order to reduce centrifugal force generated by rotation. The holding member 321, for example, is configured by a cylindrical molded body. In addition, the holding member 321 may also be formed by winding a material that configures the holding member 321 on the outer peripheral surface 317 of the plurality of magnets 311. For example, the holding member 321 may also be formed by winding a threadlike, belt-like, or sheet-like material on the outer peripheral surface 317 of the magnets 311 while circulating a plurality of times in a rotation direction up to a predetermined thickness so as to cover the respective magnets 311.

As a material of the holding member 321, for example, a material with superior specific strength (tensile strength per unit density) such as a carbon fiber, a glass fiber, an aramid fiber, a silicon carbide fiber, a boron fiber, a titanium alloy fiber, or an ultra high molecular weight polyethylene or polybutylene terephthalate fiber is preferable. Furthermore, as a material of the holding member 321, FRP (fiber-reinforced resin) using a carbon fiber, a glass fiber, an aramid fiber, a silicon carbide fiber, a boron fiber, a titanium alloy fiber, or an ultra high molecular weight polyethylene or polybutylene terephthalate fiber or a composite material obtained by combining some of them is also preferable. Furthermore, as a material of the holding member 321, a non-magnetic metal such as austenitic stainless or a titanium alloy may also be used.

In the state in which the holding member 321 is fitted at the radial outside of the plurality of magnets 311 so as to surround all the magnets 311 from the radial outside and the electric motor 100 illustrated in FIG. 1 has been assembled, the sleeve part 301 is pressed toward the radial outside by the rotating axis unit 200. By this pressing, the sleeve part 301 is deformed to the radial outside and each of the magnets 311 is pushed toward the radial outside.

Meanwhile, the holding member 321 has strength strong against deformation such as expansion toward the radial outside as described above. Consequently, the holding member 321 receives pressure applied from the magnets 311 and pushes back the magnets 311 toward the radial outside by reaction force of the pressure.

By such a configuration, the magnets 311 are firmly interposed between the sleeve part 301 and the holding member 321. In this way, at the time of driving of the electric motor 100, even when the rotor member 300 has rotated at a high speed, it is possible to prevent the magnets 311 from moving relatively to the sleeve part 301 and the holding member 321 in the circumferential direction.

In this case, in the entire range of the number of rotations in which the electric motor 100 can operate, a fastening margin of the holding member 321 is set such that fixing torque between the sleeve part 301 and the rotating axis unit 200 and fixing torque between the magnets 311 and the sleeve part 301 exceed the maximum torque of the electric motor 100. In this way, the fixing torque between the rotating axis unit 200 and the sleeve part 301 and the fixing torque between the sleeve part 301 and the magnets 311 always exceed the maximum torque 20 of the electric motor 100 regardless of the number of rotations of the electric motor 100. Consequently, at the time of driving of the electric motor 100, it is possible to prevent position deviation from occurring between the rotating axis unit 200 and the sleeve part 301 and between the sleeve part 301 and the magnets 311.

Figure 8:
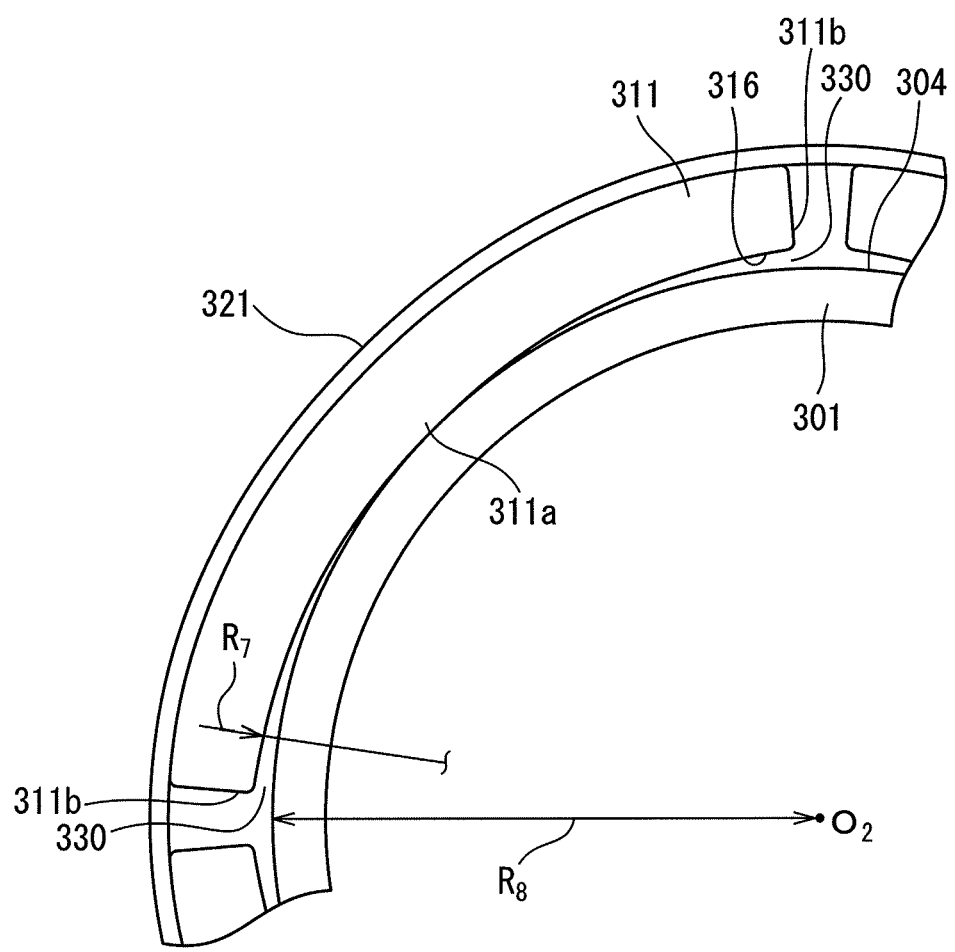
FIG. 8 is an enlarged view of main elements of FIG. 4.

In the present embodiment, the radius of the inner peripheral surface 316 of the magnet 311 is set to be larger than the radius of the outer peripheral surface 304 of the sleeve part 301. In other words, as illustrated in FIG. 8 which is an enlarged view of the main elements of FIG. 4, when the curvature radius of the inner peripheral surface 316 of the magnet 311 is defined as $R_7$ and the radius of the outer peripheral surface 304 of the sleeve part 301 is defined as $R_8$, $R_7 > R_8$.

By such a configuration, in the state in which the rotor member 300 has been assembled, a gap 330 is formed between the inner peripheral surface 316 of the magnet 311 and the outer peripheral surface 304 of the sleeve part 301. The gap 330 is a gap formed by a radius difference between the curvature radius $R_7$ of the inner peripheral surface 316 of the magnet 311 and the radius $R_8$ of the outer peripheral surface 304 of the sleeve part 301, and is appropriately set in consideration of the expansion of the sleeve part 301 when the rotating axis unit 200 has been press-fitted.

The gap 330 is gradually increased toward a circumferential edge portion 311b from a contact portion 311a of the magnet 311, at which the sleeve part 301 and the magnet 311 make contact with each other, and becomes maximum at the circumferential edge portion 311b. In addition, in the example of FIG. 8, at a circumferential center portion of the magnet 311, the inner peripheral surface 316 of the magnet 311 and the outer peripheral surface 304 of the sleeve part 301 make contact with each other. In other words, the circumferential center portion becomes the contact portion 311a and the gap 330 becomes zero at the circumferential center portion, but the sleeve part 301 and the magnet 311 also make contact with each other at a portion (for example, one circumferential edge portion 311b) other than the center portion. In this case, the one circumferential edge portion 311b becomes the contact portion 311a. Also in this case, the gap 330 is gradually increased from the contact portion 311a of the magnet 311 to a circumferential edge portion (the other circumferential edge portion 311b).

As described above, the gap 330 of the radial direction is provided between the inner peripheral surface 316 of the magnet 311 and the outer peripheral surface 304 of the sleeve part 301, and therefore it is possible to prevent the magnet 311 from being cracked when the rotating axis unit 200 is pressed-fitted along the inner peripheral surface 306 of the rotor member 300 (the sleeve part 301).

In other words, when the rotor member 300 is pressed-fitted to the rotating axis unit 200, the sleeve part 301 of the rotor member 300 is expanded (diameter expansion) to the radial outside so as to eliminate the gap 330, and therefore the outer peripheral surface 304 of the sleeve part 301 and the inner peripheral surface 316 of the radial inside of the magnet 311 make surface-contact with each other. Consequently, when the diameter of the sleeve part 301 has been expanded, it is possible to reduce stress generated in the magnet 311 and to prevent cracking of the magnet 311.

Next, a manufacturing method of the rotor 400 according to the embodiment of the present invention will be described. Firstly, the sleeve part 301, the magnet 311, and the holding member 321 are prepared. The sleeve part 301, for example, is obtained by using an iron-based metal as a constitution material, cutting an inner peripheral surface and an outer peripheral surface of a cylindrical member to form the tapered inner peripheral surface 306, the outer peripheral surface 304, and the convex part 305, and performing a phosphoric acid-based, a sulfuric acid-based, or a hydrochloride acid-based chemical surface treatment on the outer peripheral surface 304. The magnet 311, for example, is obtained by configuring a permanent magnet having an approximately arc shape in which the inner peripheral surface 316 has a predetermined curvature radius R7. The holding member 321, for example, is obtained by carbon fiber-reinforced resin formed in a cylindrical shape.

Next, the plurality of magnets 311 is arranged along the outer peripheral surface 304 of the sleeve part 301 at an equal interval. In this case, the magnets 311 are arranged such that magnetic poles of an inner peripheral surface side and an outer peripheral surface side of the magnets adjacent to each other in the circumferential direction are different from each other. For example, when four magnets 311A to 311D are arranged in the circumferential direction, the magnets 311A and 311B, 311B and 311C, 311C and 311D, and 311D and 311A are respectively arranged adjacent to each other. At this time, the magnets 311A to 311D are arranged such that an inner peripheral side and an outer peripheral side of the magnets 311A and 311C are respectively an S pole and a N pole, and an inner peripheral side and an outer peripheral side of the magnets 311B and 311D are respectively a N pole and an S pole.

In other words, in the present embodiment, the magnets 311A to 311D disposed in the circumferential direction while facing the outer peripheral surface 304 of the sleeve part 301 are arranged such that respective magnetic poles are alternately changed in the circumferential direction.

Next, an adhesive is impregnated between the sleeve part 301 and the plurality of magnets 311, which face each other, and then the holding member 321 is mounted so as to cover the plurality of magnets 311 from the radial outside. In other words, the holding member 321 is fitted to the radial outside of the magnets 311 such that the inner peripheral surface 324 of the holding member 321 faces the outer peripheral surface 317 of the magnets 311. At this time point, both may also be subjected to clearance fit or interference fit. In the case of the interference fit, it is sufficient if there is a slight fastening margin for preventing the holding member 321 from escaping.

In order to easily perform the fitting of the holding member 321, it is preferable to cool the sleeve part 301, on which the magnets 311 have been arranged, before the holding member 321 is arranged around the magnets 311. For example, the magnets 311 and the sleeve part 301 are cooled in an industrial refrigerator up to a predetermined temperature or less (for example, −50° C. or less, preferably, −70° C. or less). In this way, the outermost diameter (the diameter of the outer peripheral surface 317 of the magnets 311 about the axial center $O_1$) of the sleeve part 301, on which the magnets 311 have been arranged, is reduced, and therefore the holding member 321 can be easily fitted around the magnets 311. In particular, when the holding member 321 is configured by a carbon fiber having a small line expansion coefficient, since it is difficult to shrink-fit the holding member 321, it is preferable to cool the sleeve part 301 on which the magnets 311 have been arranged.

The adhesive is impregnated over an entire range between the outer peripheral surface 304 of the sleeve part 301 and the inner peripheral surface 316 of the magnets 311, or into at least a partial region. The adhesive may also be impregnated after the periphery of the magnets 311 is surrounded by the holding member 321 other than before the periphery of the magnets 311 is surrounded by the holding member 321. When the magnets 311 are arranged along the outer peripheral surface 304 of the sleeve part 301, the adhesive may also be coated on at least one of the outer peripheral surface 304 of the sleeve part 301 and the inner peripheral surface 316 of the magnets 311.

The adhesive used herein, for example, is an acryl-based anaerobic adhesive containing hydroperoxide. The acryl-based adhesive is generally preferable from the standpoint of flexibility and wettability for an adhesion object, and can be easily infiltrated into the gap 330 formed by a curvature difference between the sleeve part 301 and the magnets 311. Furthermore, since the acryl-based anaerobic adhesive does not need hardening due to different heating of a heat curable adhesive such as an epoxy-based adhesive, workability is good. Since it is not necessary to consider heat demagnetization of the magnets 311, it is preferable.

The anaerobic adhesive generally includes (metha) acrylic acid as a main component. The (meta) acrylic acid, for example, indicates multifunctional methacrylic ester, and specifically is polyglycol dimethacrylate. A part of the polyglycol may also be replaced with various segments such as polyester and polycarbonate.

The hydroperoxide, for example, is cumene hydroperoxide. The hydroperoxide is reduced under the presence of a metal ion and starts a polymerization reaction. In other words, the hydroperoxide starts a hardening reaction. In the present embodiment, since the sleeve part 301 is configured by an iron-based metal and the chemical surface treatment is performed on the surface of the sleeve part 301, the hardening reaction is quickly performed by the presence of the metal ion and an increase in a contact region between an adhesive and a metal. As a consequence, the hardening reaction is quickly performed even in a part in which anaerobic is not sufficient, and therefore it is possible to firmly adhere the magnets 311.

Next, the rotating axis unit 200 as illustrated in FIG. 2 is prepared. For example, an outer peripheral surface of a cylindrical rod member is cut to form the outer peripheral surface 202. Moreover, before and after the outer peripheral surface 202, the cylindrical outer peripheral surface 207 and the abutting part 203 may also be provided according to necessity.

Figure 9:
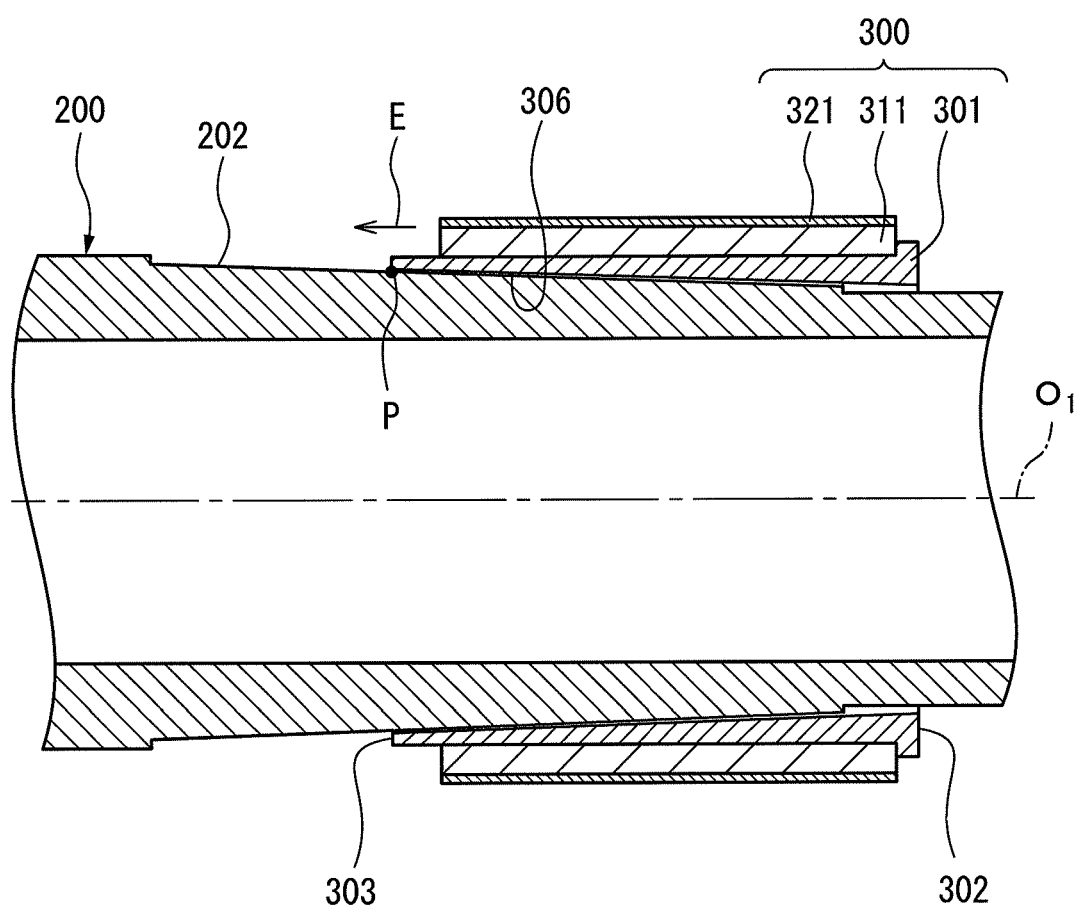
FIG. 9 is a sectional view for explaining a press-fitting process of press-fitting a rotor member to a rotating axis unit.
Figure 10:
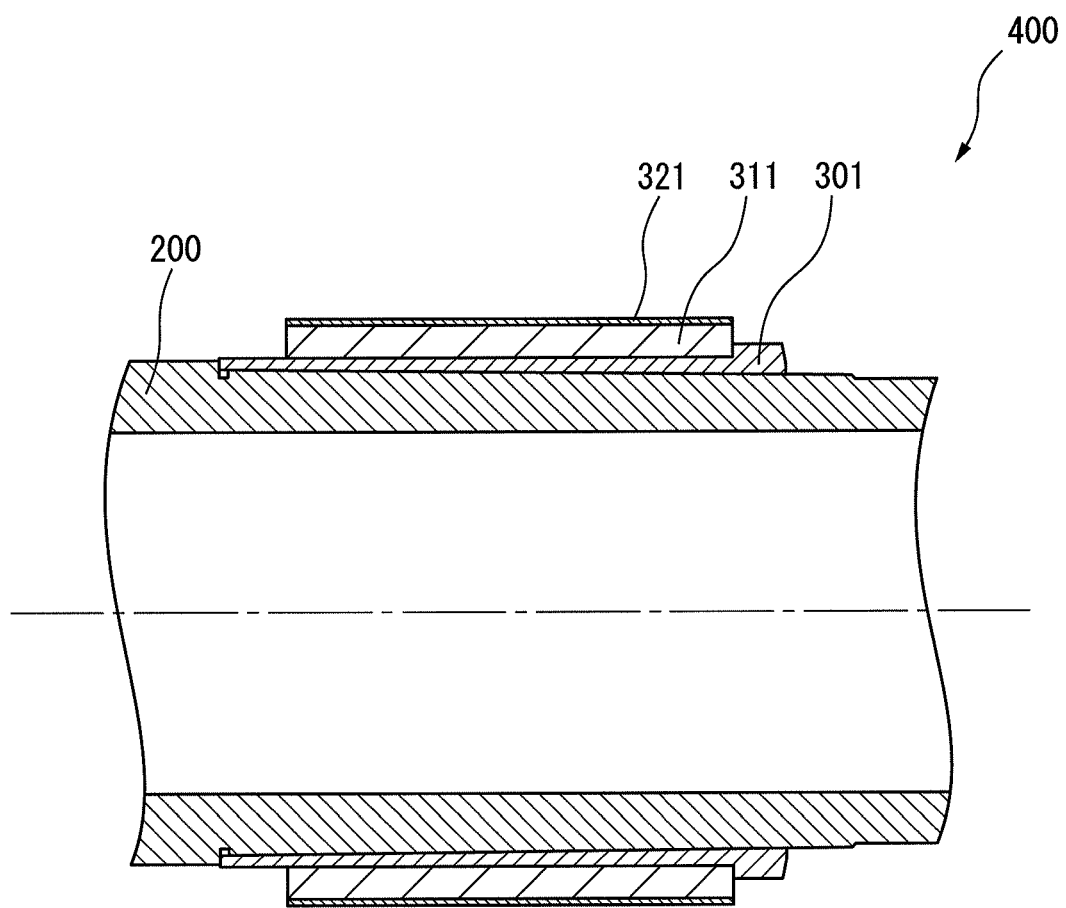
FIG. 10 is a sectional view illustrating a rotor after a press-fitting process.

Next, before the adhesive is hardened, the rotor member 300 is fitted from the axial rear side of the rotating axis unit 200. In other words, the rotor member 300 is press-fitted to the radial outside of the rotating axis unit 200. This press-fitting process will be described in detail. FIG. 9 and FIG. 10 are diagrams for explaining the press-fitting process. As illustrated in FIG. 9, firstly, the sleeve part 301 of the rotor member 300 is fitted to the axial rear end of the rotating axis unit 200 from the second end portion 303 side.

Then, the rotating axis unit 200, for example, an end surface (not illustrated) of a second side (the front side) of the rotating axis unit 200 in the axial direction is held toward a first side (the rear side) in the axial direction, and the end portion 302 of the sleeve part 301 of the rotor member 300 is pressed toward an opposite direction of the axial direction with respect to the holding direction. In other words, the rotor member 300 is pushed in toward the axial front side as illustrated by an arrow E of FIG. 9.

In this way, the axial front end of the tapered inner peripheral surface 306 of the sleeve part 301 and the tapered outer peripheral surface 202 of the rotating axis unit 200 abut each other at an abutting portion P. From this state, the rotor member 300 is further press-fitted toward the axial front side with respect to the rotating axis unit 200. In detail, the rotor member 300 is press-fitted toward the axial front side until the second end portion 303 of the sleeve part 301 abuts a predetermined position, for example, the stepped part 204 of the abutting part 203 in the example of the drawing.

At this time, the sleeve part 301 moves to the axial front side along the tapered surface from the abutting portion P to the stepped part 204, and is expanded toward the radial outside. In other words, in this state, the rotor member 300 is fixed to the rotating axis unit 200 by interference fit. In addition, in this state, the sleeve part 301 may also be deformed beyond an elastic deformation region.

Figure 11:
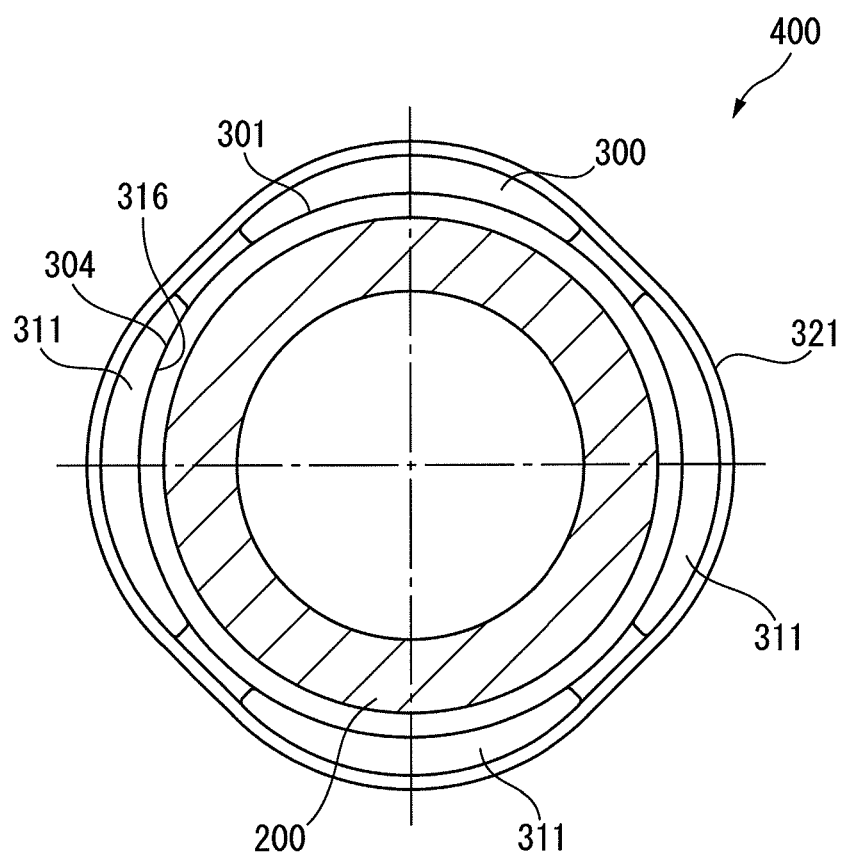
FIG. 11 is a sectional view schematically illustrating a rotor in a completion state.

While the sleeve part 301 is being press-fitted up to a predetermined fixed position, the sleeve part 301 is expanded to the radial outside by force by which the sleeve part 301 is press-fitted, and therefore the magnets 311 also move to the radial outside. As a consequence, the holding member 321 also receives force outward and thus is also expanded toward the radial outside. In this way, elastic compression force is accumulated in the holding member 321, the magnets 311 and the sleeve part 301 are interposed between the tapered outer peripheral surface 202 of the rotating axis unit 200 and the holding member 321 by the elastic compression force, and fixing of the magnets 311 and the outer peripheral surface 304 of the sleeve part 301 in the circumferential direction and fixing of the tapered inner peripheral surface 306 of the sleeve part 301 and the tapered outer peripheral surface 202 of the rotating axis unit 200 are completed by pressure (surface pressure) generated between respective contact surfaces at that time. In this way, the rotor 400 illustrated in FIG. 10 is manufactured. FIG. 11 is a sectional view schematically illustrating the rotor 400 in the completed state.

Figure 12A:
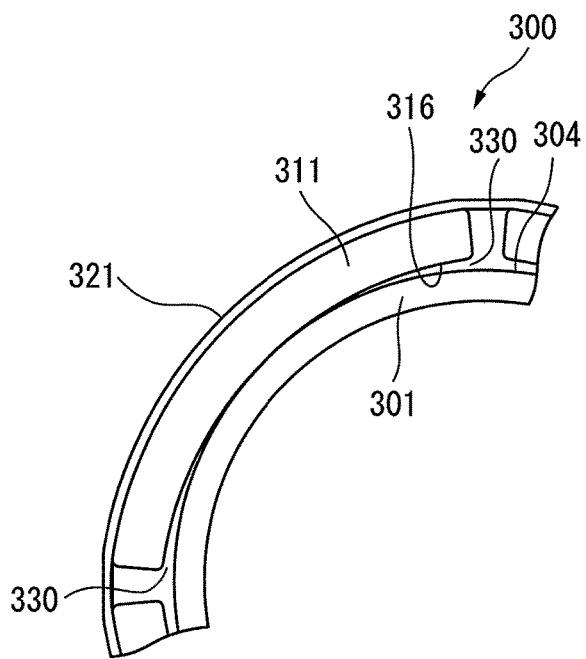
FIG. 12A is a sectional view illustrating main elements of a rotor member in a state before being press-fitted to a rotating axis unit.
Figure 12B:
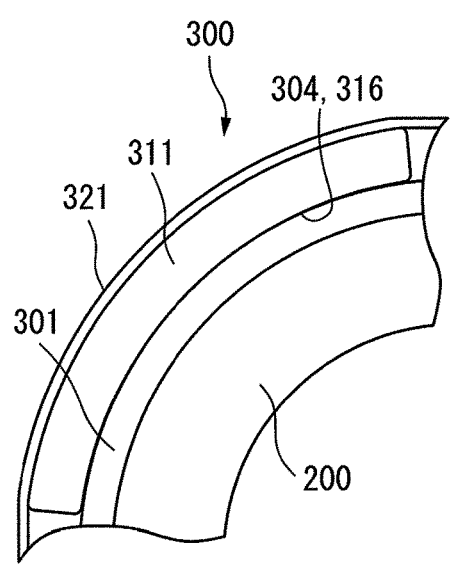
FIG. 12B is a sectional view illustrating main elements of a rotor member after being press-fitted to a rotating axis unit.

In the present embodiment, the magnets 311 arranged in a row in the circumferential direction are employed, and the curvature radius $R_7$ of the inner peripheral surface 316 of the magnet 311 is larger than the radius $R_8$ of the outer peripheral surface 304 of the sleeve part 301 (FIG. 8). In this way, in the process of manufacturing the rotor 400, it is possible to prevent the magnets from being cracked. This point will be described with reference to FIG. 12A and FIG. 12B. In addition, FIG. 12A illustrates the rotor member 300 in a state before being press-fitted to the rotating axis unit 200, and corresponds to FIG. 8. On the other hand, FIG. 12B illustrates the rotor member 300 in a state after being press-fitted to the rotating axis unit 200, and corresponds to FIG. 11. In addition, the shape of the magnet 311 of FIG. 11 is different from the shape of the magnet 311 of FIG. 12A and FIG. 12B.

As illustrated in FIG. 12A, in the state before the rotor member 300 is press-fitted to the rotating axis unit 200, the gap 330 is provided between the inner peripheral surface 316 of the magnet 311 and the outer peripheral surface 304 of the sleeve part 301. From this state, when the rotating axis unit 200 is press-fitted into the rotor member 300, the sleeve part 301 is expanded to the radial outside and the gap 330 is eliminated, and therefore the outer peripheral surface 304 of the sleeve part 301 and the inner peripheral surface 316 of the magnet 311 make surface-contact with each other as illustrated in FIG. 12B. In this way, it is possible to prevent excessive force from being applied to the magnet 311 from the sleeve part 301, and to prevent cracking of the magnet 311.

The press-fitting process is performed before the adhesive is hardened. Therefore, an extra adhesive of the gap 330 between the sleeve part 301 and the magnet 311 is pushed to the circumferential outside or the axial outside when the diameter of the sleeve part 301 has been expanded, and therefore it is possible to prevent the cracking of the magnet 311. Meanwhile, if the press-fitting process is performed after the adhesive is hardened, when the diameter of the sleeve part 301 has been expanded, since the deformation of the magnet 311 is not able to follow the deformation of the sleeve part 301, the magnet 311 may be cracked.

When the rotor 400 is rotated at a high speed, since the centrifugal force applied to the magnet 311 increases, it is necessary to enhance holding force of the magnet 311. The holding force of the magnet 311 can be enhanced by increasing the compressive holding force generated by the holding member 321. The compressive holding force, for example, can be enhanced by increasing the thickness of the holding member 321 in the radial direction (a first method), using a fiber with a high elastic coefficient as a material of the holding member 321 (a second method), or increasing a press-fitting margin between the sleeve part 301 and the rotating axis unit 200 and increasing a diameter expansion amount of the holding member 321 (a third method).

However, since it is difficult to increase a distance (a gap) between the magnet 311 and the stator core 103 by a predetermined amount or more, there is a limitation in the first method. In the second method, a material selection range is considerably limited. In the third method, when the diameter expansion amount of the holding member 321 is excessively increased, a problem of peeling, cracking, breaking and the like of the holding member 321 occurs. Thus, in order to enhance the holding force of the magnet 311, as with the present embodiment, it is preferable that the curvature radius of the outer peripheral surface 304 of the sleeve part 301 is allowed to be smaller than the curvature radius of the inner peripheral surface 316 of the magnet 311, the entire surface of the magnet 311 is configured to make contact with the sleeve part 301 when the diameter of the sleeve part 301 has been expanded, and an adhesive is impregnated between the outer peripheral surface 304 of the sleeve part 301 and the inner peripheral surface 316 of the magnet 311 to fix the magnet 311 via the adhesive.

According to the present embodiment, the following operations and effects can be obtained.

(1) The rotor member 300 includes the cylindrical sleeve part 301 having the circular outer peripheral surface 304, the plurality of magnets 311 arranged along the outer peripheral surface 304 and including the inner peripheral surface 316 having the curvature radius $R_7$ larger than the curvature radius $R_8$ of the outer peripheral surface 304, and the cylindrical holding member 321 surrounding the plurality of magnets 311. Between the outer peripheral surface 304 of the sleeve part 301 and the inner peripheral surface 316 of the magnets 311, the gap 330 of the radial direction is formed so as to be gradually increased toward the circumferential edge portion 311b of the magnets 311 from the contact portion 311a of the magnets 311, at which the sleeve part 301 and the magnets 311 make contact with each other.

In this way, it is possible to prevent the cracking of the magnets 311 when the rotating axis unit 200 has been press-fitted into the rotor member 300 and the diameter of the sleeve part 301 has been expanded, and to firmly hold the plurality of magnets 311 between the sleeve part 301 and the holding member 321. Furthermore, since the plurality of magnets 311 (other than cylindrical magnets) having the inner peripheral surface with an arc shape are arranged around the sleeve part 301, even when a fastening margin between the rotor member 300 and the rotating axis unit 200 is large and the diameter expansion amount of the sleeve part 301 is large, it is possible to prevent the cracking of the magnets 311. At the time of diameter expansion of the sleeve part 301, since the sleeve part 301 and the magnets 311 make contact with each other in the entire surface and pressing force is applied to the magnets 311 from the sleeve part 301 and the holding member 321, the holding force for the magnets 311 is enhanced. Consequently, it is possible to hold a more weighted magnet 311, and to increase the thickness of the magnets 311 in the radial direction. As a consequence, it is possible to improve the torque and output of the electric motor 100.

(2) Since the sleeve part 301 is configured by an iron-based metal, processing of the sleeve part 301 becomes easy, and therefore it is possible to reduce the manufacturing cost. Furthermore, since the inner peripheral surface and the outer peripheral surface of the sleeve part 301 are configured in a circular shape, the thickness of the sleeve part 301 in the radial direction becomes constant over the whole circumference in the circumferential direction, and therefore it is possible to uniformly expand the sleeve part 301 in the circumferential direction and to allow the sleeve part 301 and the magnets 311 to uniformly make contact with each other in the circumferential direction at the time of press-fitting of the rotating axis unit 200. As a consequence, frictional force between the sleeve part 301 and the rotating axis unit 200 increases, and therefore it is possible to prevent sliding of the magnets 311 in the circumferential direction with respect to the sleeve part 301 at the time of rotation of the rotor 400.

(3) Since the phosphoric acid-based, the sulfuric acid-based, or the hydrochloride acid-based chemical surface treatment is performed on at least a part of the outer peripheral surface 304 of the sleeve part 301, a frictional coefficient of the outer peripheral surface 304 becomes large, and therefore it is possible to firmly fix the magnets 311 to the sleeve part 301. Furthermore, since the chemical surface treatment is performed, when the anaerobic adhesive is used in the fixed surface of the magnets 311, it is possible to promote a hardening reaction thereof. Furthermore, it is possible to enhance adhesive force by the chemical surface treatment.

(4) Since the magnets 311 have not adhered to the outer peripheral surface 304 of the sleeve part 301 in the stage of the rotor member 300, the magnets 311 can be displaced relatively to the sleeve part 301 until an entire inner peripheral surface of the magnets 311 makes contact with the outer peripheral surface 304 of the sleeve part 301, and therefore the cracking of the magnets 311 can be prevented.

(5) The rotor 400 includes the rotating axis unit 200 and the rotor member 300 press-fitted and fixed to the outer peripheral surface 202 of the rotating axis unit 200. The outer peripheral surface 304 of the sleeve part 301 and the inner peripheral surface 316 of the magnets 311 make contact with each other such that the gap 303 is eliminated by the diameter expansion of the sleeve part 301 due to the press-fitting of the rotating axis unit 200, and the sleeve part 301 and the plurality of magnets 311 are interposed between the rotating axis unit 200 and the holding member 321 by elastic restoring force generated in the holding member 321 toward the radial inside by the press-fitting of the rotating axis unit 200. Consequently, the rotating axis unit 200 is press-fitted into the rotor member 300, and therefore it is possible to firmly hold the magnets 311 without cracking, resulting in the enhancement of the reliability of the rotor 400. Since the holding force of the magnets 311 is enhanced in the rotation direction of the rotor 400, it is possible to increase the maximum number of rotations of the rotor 400, resulting in an increase the output of the electric motor 100.

(6) In the state in which the rotor 400 has been completed, the outer peripheral surface 304 of the sleeve part 301 and the inner peripheral surface 316 of the magnets 311 adhere to each other by the adhesive over at least a partial region. Therefore, it is not necessary to excessively enhance the elastic restoring force of the holding member 321, and when the holding member 321 includes a carbon fiber, it is possible to firmly fix the magnets 311 to the sleeve part 301 while preventing scattering of the fiber, and peeling, cracking, breaking and the like of a fiber layer.

(7) As the adhesive, the acryl-based anaerobic adhesive containing hydroperoxide is used, and therefore a hardening reaction of the adhesive is quickly performed and thus it is possible to more reliably perform the adhesion of the magnets 311.

(8) In the state in which the rotor 400 has been completed, the inner peripheral surface 316 of the magnets 311 makes contact with the outer peripheral surface 304 of the sleeve part 301 over the entire surface in the circumferential direction. Consequently, it is possible to enhance the holding force of the magnets 311, and stress concentration at the contact portion between the magnets 311 and the sleeve part 301 is attenuated, and therefore it is possible to prevent the cracking of the magnets 311.

(9) When an electric motor, in particular, an electric motor for a machine tool is configured by the rotor 400, since high holding force of the magnets 311 is required, it is particularly preferable. In other words, it is highly probable that the magnets will slide in the rotation direction by an impact (a speed variation) of the rotation direction generated at the time of cutting with respect to the main shaft of the machine tool. Therefore, when a rotor is used in the electric motor for a machine tool, it is necessary to more reliably perform the fixing of the magnets in the rotation direction of the rotor. At this point, the rotor of the present embodiment can be preferably used.

(10) As a method for manufacturing the rotor 400, the plurality of magnets 311 are arranged along the outer peripheral surface 304 of the sleeve part 301, the holding member 321 is arranged so as to surround the plurality of magnets 311, the adhesive is impregnated between the sleeve part 301 and the magnets 311, the rotor member 300 is press-fitted to the radial outside of the rotating axis unit 200 before the adhesive is hardened, the outer peripheral surface 304 of the sleeve part 301 and the inner peripheral surface 316 of the magnets 311 are allowed to make contact with each other such that the gap 330 is eliminated by the diameter expansion of the sleeve part 301 due to the press-fitting of the rotating axis unit 200 when the rotor member 300 is press-fitted, and the sleeve part 301 and the plurality of magnets 311 are allowed to be interposed between the rotating axis unit 200 and the holding member 321 by the elastic restoring force generated in the holding member 321 toward the radial inside by the press-fitting of the rotating axis unit 200.

In this way, before the adhesive is hardened, the diameter of the sleeve part 301 can be expanded by interference fit, and therefore the rotating axis unit 200 and the rotor member 300 can be integrally formed with each other by allowing them to make surface contact with each other while preventing the cracking of the magnets 311. In particular, a built-in motor is bought by a buyer in the state of the rotor member 300. Therefore, if the magnets 311 adheres to the sleeve part 301 in the stage of the rotor member 300, when a buyer of a motor press-fits the rotating axis unit 200 into the rotor member 300, since the inner peripheral surface of the magnets 311 is drawn in the circumferential direction according to the expansion of the sleeve part 301, the magnets 311 may be cracked. At this point, in the present embodiment, the rotating axis unit 200 is press-fitted before the adhesive is hardened, and therefore it is possible to prevent the cracking of the magnets 311.

(11) After the rotor member 300 is press-fitted, since the adhesive is hardened, it is possible to firmly fix the magnets 311 to the sleeve part 301 and thus to reliably prevent the sliding of the magnets 311 in the state in which the rotor 400 has been completed.

(12) When the holding member 321 has a carbon fiber, before the holding member 321 is arranged so as to surround the plurality of magnets 311, the sleeve part 301, on which the plurality of magnets 311 have been arranged, is cooled, and therefore it is possible to easily fit the holding member 321 to the outer peripheral surface 317 of the magnets 311 without using shrinkage fit.

In addition, in the aforementioned embodiment, the magnets 311 and the sleeve part 301 are fixed by the adhesive. However, if it is possible to obtain sufficient holding force of the magnets 311 with respect to the number of rotations of the rotor 400, the adhesive may also be omitted. In other words, if the gap 330 of the radial direction increased toward the circumferential edge portion 311b of the sleeve part 301 is formed between the outer peripheral surface 304 of the cylindrical sleeve part 301 and the inner peripheral surface 316 of the plurality of magnets 311 arranged along the outer peripheral surface 304, the adhesive is optional.

In the aforementioned embodiment, the periphery of the plurality of magnets 311 is covered by the holding member 321. However, a separate cylindrical member may also be arranged around the holding member 321. In this way, it is possible to protect bonding places of the end portions of the holding member 321 from peeling due to wind pressure at the time of rotation of the rotor 400, thereby extending the lifespan of the rotor 400.

Figure 13:
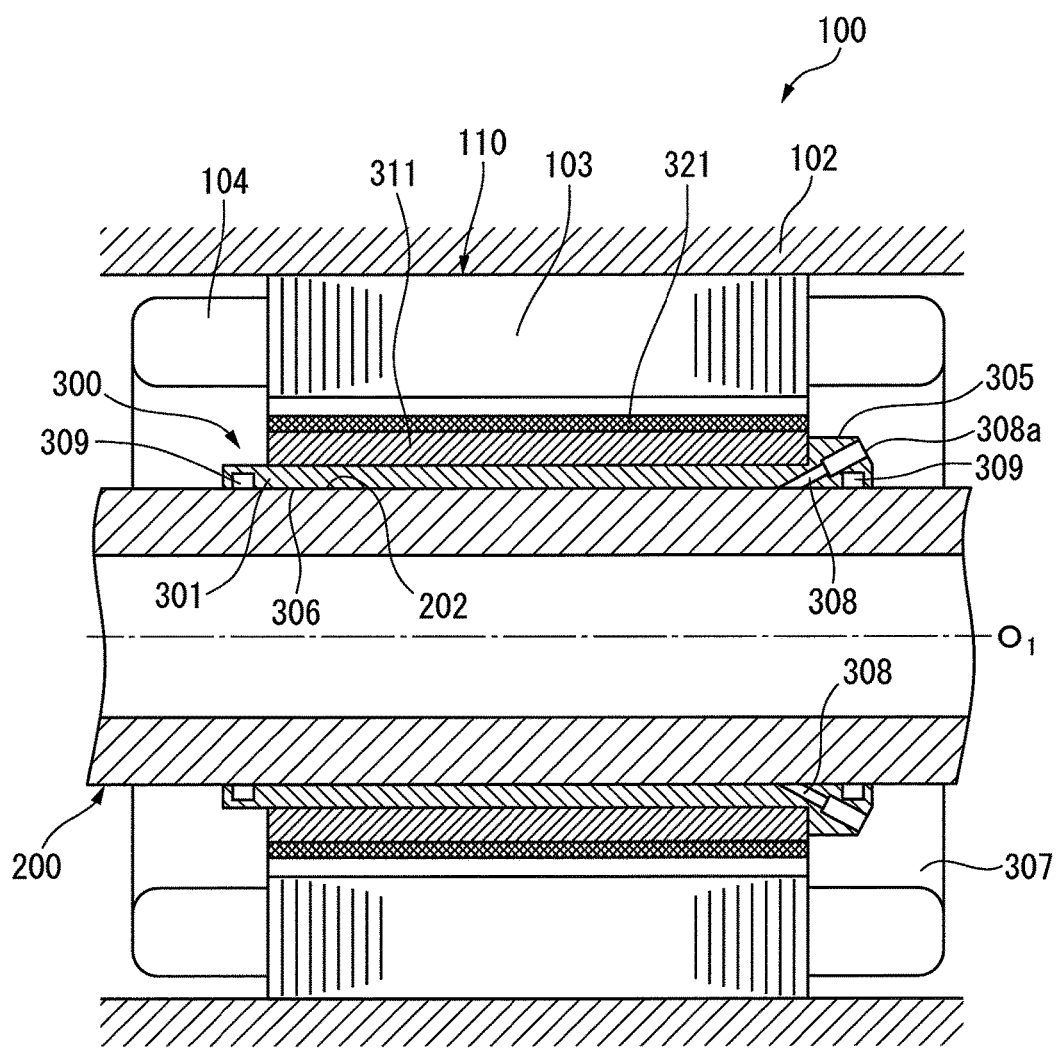
FIG. 13 is a diagram illustrating a modification of FIG. 1.

In the aforementioned embodiment, tapered surfaces are respectively formed in the outer peripheral surface 202 of the rotating axis unit 200 and the inner peripheral surface 306 of the sleeve part 301 and both are press-fitted via these tapered surfaces. However, the configurations of the press-fitting surfaces (the outer peripheral surface 202 and the inner peripheral surface 306) are not limited thereto. FIG. 13 is a diagram illustrating a modification of FIG. 1. In FIG. 13, the inner peripheral surface 306 of the sleeve part 301 and the outer peripheral surface 202 of the rotating axis unit 200 are not respectively tapered surfaces, but cylindrical surfaces about the axial center $O_1$ and the sleeve part 301 and the rotating axis unit 200 are integrally fixed by interference fit.

In more detail, a plurality of fluid passages 308, which communicate with an external space 307 of the rotor 400 and a press-fitting surface between the inner peripheral surface 306 of the sleeve part 301 and the outer peripheral surface 202 of the rotating axis unit 200, are formed in the convex part 305 of the sleeve part 301 at an equal interval in the circumferential direction. Each fluid passage 308 is formed with a screw hole 308a facing the external space 307. The sleeve part 301 is formed at both end portions thereof in the axial direction with annular grooves, and a sealing member 309 such as an O ring is fitted into the annular groove.

In FIG. 13, when the rotor member 300 is press-fitted to the rotating axis unit 200, a nozzle for oil supply is put into the screw hole 308a, and therefore oil is supplied between the inner peripheral surface 306 and the outer peripheral surface 202 via the plurality of fluid passages 308 in the circumferential direction. The diameter of the sleeve part 301 is expanded by pressure of the supplied oil, and therefore it is possible to easily fit the rotor member 300 to the outer peripheral surface 202 of the rotating axis unit 200. At this time, at least one of the fluid passages 308 serves as an air vent. Since the supplied oil is sealed by the sealing member 309, it is possible to prevent leakage of the oil to the external space 307. Since the oil has a function of enhancing lubricity, the rotating axis unit 200 can slide to a predetermined position in the axial direction.

In addition, in the aforementioned embodiment, an example, in which the rotor member 300 and the rotor 400 are applied to an electric motor for driving the main shaft of a machine tool, has been described. However, the rotor member and the rotor of the present invention can also be similarly applied to other electric motors (dynamo-electric machines) as well as the electric motor of the machine tool.

According to the present invention, between an outer peripheral surface of a cylindrical sleeve part and an inner peripheral surface of a plurality of magnets arranged along the outer peripheral surface, a gap of a radial direction increased toward a circumferential edge portion of the magnets is formed, and therefore it is possible to prevent cracking of the magnets when a rotating axis unit is press-fitted and the diameter of the sleeve part has been expanded, and to firmly fix the plurality of magnets to the sleeve part.

The above description is merely an example, and the present invention is not limited to the aforementioned embodiments and modifications as long as they do not impair the features of the present invention. Elements of the embodiments and the modifications include elements which can be replaced and are apparently replaced while maintaining the identification of the present invention. In other words, other embodiments considered within the technical scope of the present invention are included in the scope of the present invention. Furthermore, one or more of the embodiments and the modifications can also be arbitrarily combined.

The invention claimed is:

1. A method for manufacturing a rotor, the rotor including a rotating axis having a tapered surface on an outer peripheral surface of the rotating axis and a rotor member fixed to the tapered outer peripheral surface of the rotating axis, comprising the steps of:
    providing a sleeve part, a plurality of magnets and a cylindrical holding member, as component parts of the rotor member, wherein
        the sleeve part is a cylindrical sleeve part including a circular outer peripheral surface and an inner peripheral surface having a tapered surface which is fitted to the tapered outer peripheral surface of the rotating axis by interference fit,
        the sleeve part is configured by an iron-based metal,
        at least a part of the outer peripheral surface of the sleeve part is subjected to a phosphoric acid-based, a sulfuric acid-based, or a hydrochloride acid-based chemical surface treatment,
        a plurality of magnets include an inner peripheral surface having a curvature radius larger than a curvature radius of the outer peripheral surface of the sleeve part,
        the cylindrical holding member is configured by fiber reinforced resin having a carbon fiber,
    fabricating the rotor member provided with a gap of a radial direction between the outer peripheral surface of the sleeve part and the inner peripheral surface of each of the magnets, the gap being increased toward a circumferential edge portion of the magnets, comprising the steps of:

arranging the plurality of magnets at least in the circumferential direction of the sleeve part along the outer peripheral surface of the sleeve part while facing the outer peripheral surface of the sleeve part with the inner peripheral surface of the magnets each other;

impregnating an adhesive between the sleeve part and the magnets, the adhesive being an acryl-based anaerobic adhesive containing hydroperoxide;

arranging the holding member so as to surround the plurality of magnets;

press-fitting the rotor member to a radial outside of the rotating axis before the adhesive is hardened;

allowing the outer peripheral surface of the sleeve part and the inner peripheral surface of the magnets to make contact with each other such that the gap is eliminated by diameter expansion of the sleeve part due to the press-fitting of the rotating axis when the rotor member is press-fitted; and allowing the sleeve part and the plurality of magnets to be interposed between the rotating axis and the holding member by elastic restoring force generated in the holding member toward a radial inside by the press-fitting of the rotating axis.

* * * * *